United States Patent [19]

Epstein

[11] Patent Number: 4,537,516

[45] Date of Patent: Aug. 27, 1985

[54] ELECTRONIC THERMOMETER

[76] Inventor: Saul Epstein, 14558 Deervale Pl., Sherman Oaks, Calif. 91403

[21] Appl. No.: 424,601

[22] Filed: Sep. 27, 1982

[51] Int. Cl.³ .................... G01K 7/14; G01K 15/00
[52] U.S. Cl. .................................... 374/1; 374/181; 374/208; 73/1 R
[58] Field of Search ............... 374/169, 1, 158, 180, 374/181, 179, 208, 172, 173, 163, 183, 166; 324/104, 105, 74, 130, 106, 62; 364/571; 73/1 F, 1 R

[56] References Cited

U.S. PATENT DOCUMENTS

| | | | |
|---|---|---|---|
| 2,003,681 | 6/1935 | Doyle | 374/166 |
| 3,296,866 | 1/1967 | Abe et al. | 374/158 X |
| 3,582,761 | 6/1971 | Hall | 374/172 X |
| 3,889,255 | 6/1975 | Pettersen | 364/571 X |
| 3,903,743 | 9/1975 | Noller | 374/181 |
| 3,905,232 | 9/1975 | Knute | 374/158 |
| 3,916,691 | 11/1975 | Hollander et al. | 374/163 X |
| 3,935,744 | 2/1976 | Beckman | 374/181 X |
| 4,041,382 | 8/1977 | Washburn | 374/183 X |
| 4,120,201 | 10/1978 | Wargo | 374/1 X |
| 4,174,631 | 11/1979 | Hammerslag | 374/179 |
| 4,446,715 | 5/1984 | Bailey | 73/1 R |

Primary Examiner—Charles A. Ruehl

[57] ABSTRACT

A thermocouple type electronic thermometer which includes automatic adjustment of the signal conditioning circuitry to be compatible with the calibration curve of the thermocouple in use. A plurality of thermocouples are stored in a container which has conductive markings imprinted thereon which are a representation of the voltage/temperature characteristic of the thermocouples in the container. The markings are detected by contacts in the thermometer case, and the calibration of the instrument is altered so that the display will be an accurate indication of the temperature being measured. The principle is applicable to the measurement of other physical phenomena. The instrument is automatically switched on when a thermocouple probe is connected, and switched off when the probe is disconnected.

39 Claims, 12 Drawing Figures

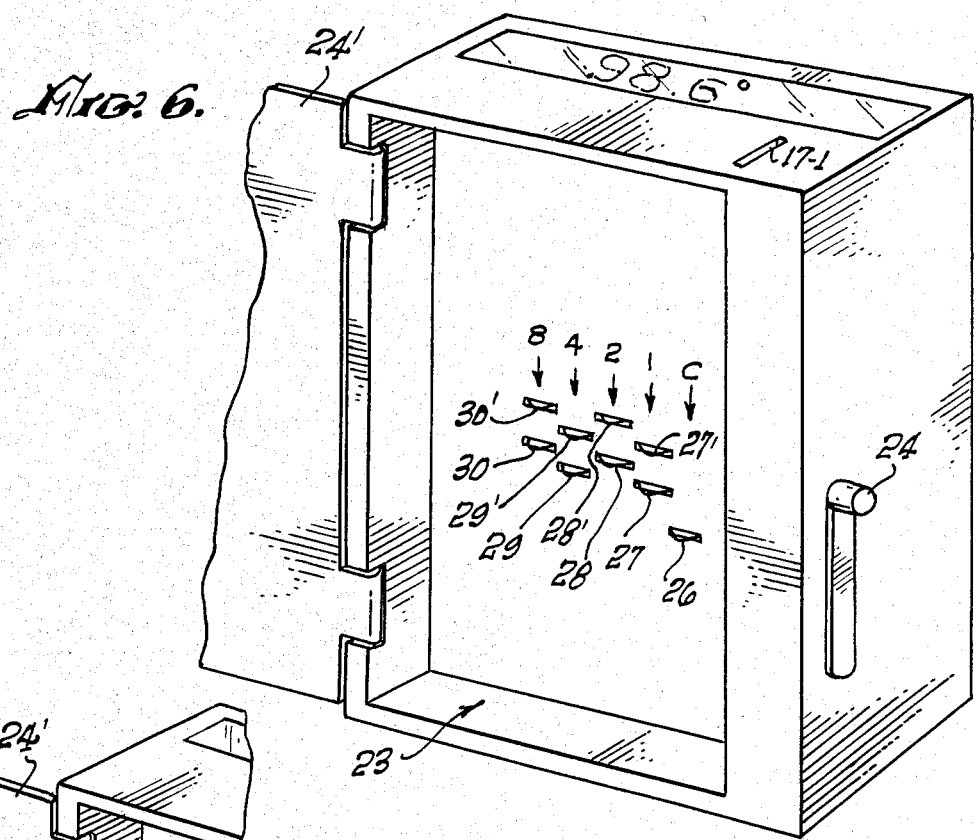
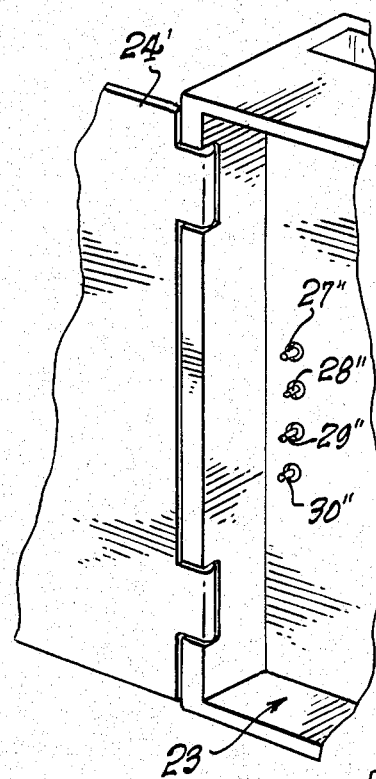
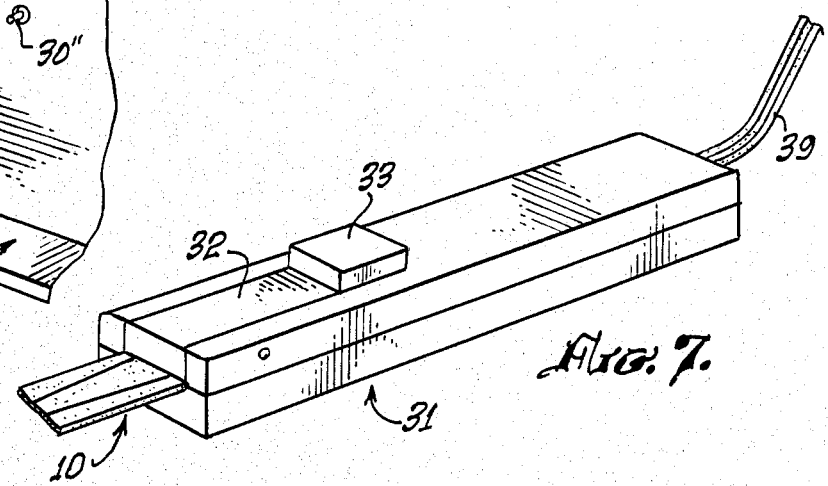

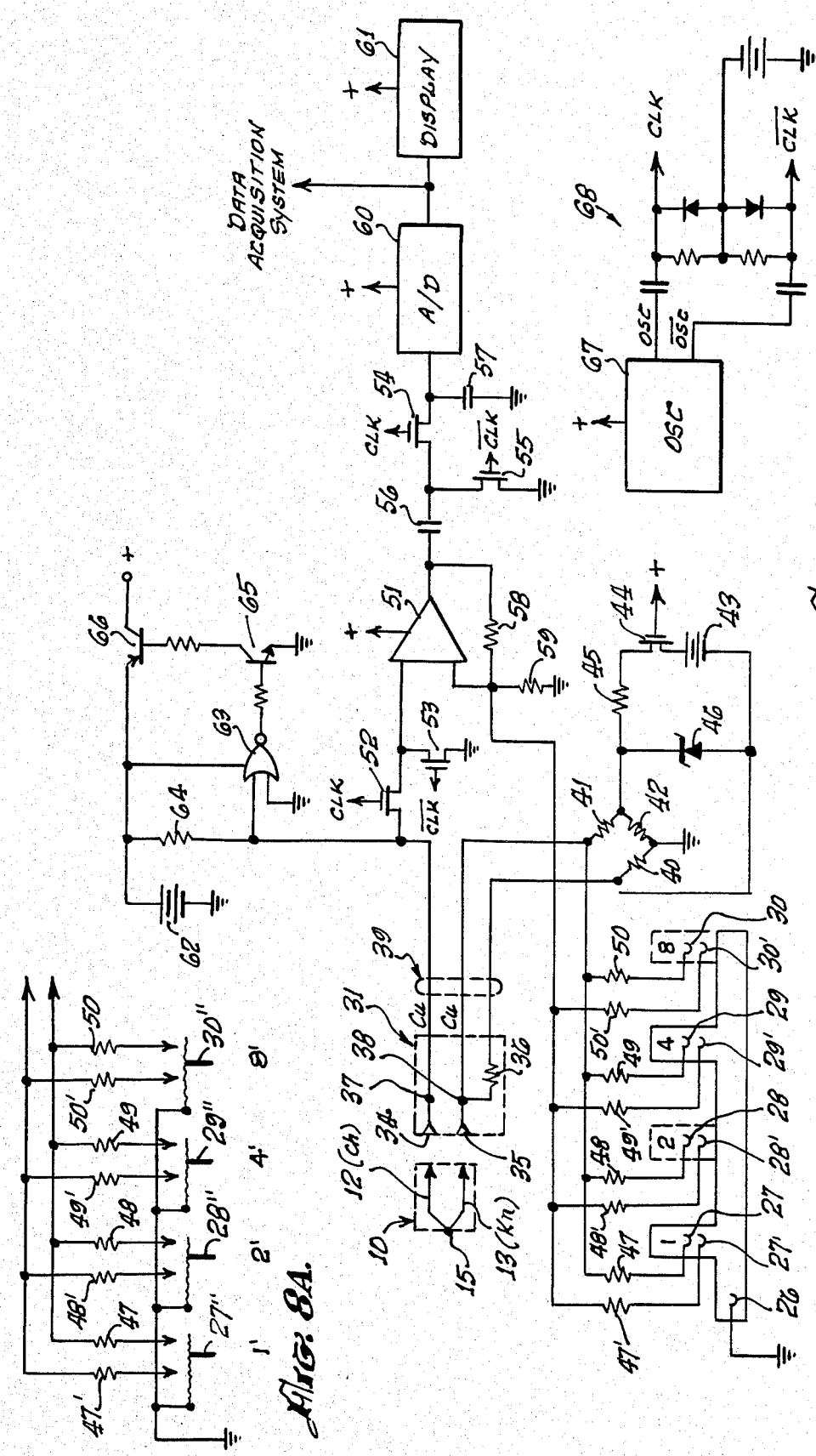

ELECTRONIC THERMOMETER

BACKGROUND OF THE INVENTION

1. Field of the Invention

This invention relates to the field of physical measurements, with particular application to the field of clinical thermometry.

2. Prior Art

The traditional mercury in glass termometer is rapidly being replaced by electronic thermometers in the field of clinical thermometry. There are two basic reasons for the preference for electronic thermometers over mercury in glass, namely, protection against cross infection, and speed of operation. Up to the present time only a moderate improvement in speed of operation has been realized. In order to protect against cross infection with current designs of electronic thermometers, it has been found necessary to use a disposable sheath to cover the sensor, since the sensors used are too costly to be considered disposable. Unfortunately, this combination results in a sensing system which takes several minutes to come into temperature equilibrium with the human mouth. No fast response sensor has yet been devised which is sufficiently inexpensive to be considered disposable, and yet is accurate enough to be used in a clinical thermometer for measuring human body temperatures. A sensor rugged enough to withstand continuous use with its disposable sheath presents a thermal system with an unavoidably long thermal time constant.

Several methods have been devised to speed the response of electronic thermometers which use long time constant sensor systems. Most common is the use of anticipation based on Newton's law of cooling. Using such anticipation circuits, practical electronic thermometers have been made which indicate the temperature being measured well before the sensor reaches its equilibrium temperature. These systems, while representing a substantial improvement over systems without anticipation, still result in a 30 to 45 second measurement cycle. Movement of the sensor in the mouth during this 30 to 45 second time period can cause inaccuracy or can cause the measurement time to be increased, or both.

To be useful, clinical thermometers must have an accuracy of plus or minus 10.2° F. when measuring temperatures in the region of the normal human body temperature of 98.6° F. An accuracy of plus or minus 10.1° F. would be preferable, if attainable.

Bare bead thermocouples can be made inexpensively enough to be considered disposable from a clinical thermometer standpoint, and with sufficiently low mass to have rapid response, but unfortunately, the best accuracy obtainable from probes made of premium wire is probably plus or minus 10.5° F. or worse. This accuracy is not adequate for clinical thermometers. Thermocouple probes have thus not been successful in clinical thermometers.

It is therefore an object of the present invention, in one of its aspects, to provide an electronic thermometer which utilizes disposable thermocouple probes, and which has adequate accuracy for clinical use.

SUMMARY OF THE INVENTION

The present invention is an electronic thermometer utilizing a disposable bare bead thermocouple probe to sense tissue temperature. The presently preferred embodiment of the invention described herein includes automatic adjustment to offset the effects of variations in the thermoelectric coefficient of the measuring thermocouple. Since the probes are disposable, no sheath of any kind to prevent cross infection is necessary and the resonse time can accordingly be made relatively short. Response times of just a few seconds are practical. The difficulty with thermocouple probes is that all thermocouple wire does not have the same emf/temperature characteristic (sometimes called the "transfer function"), even though the wire is nominally of the same type. The variation is, in fact, enough to have prevented the use of disposable thermocouple probes in clinical thermometers. Prior art manufacturers have been forced to use other types of sensors such as thermistors which are relatively more massive and expensive in conjunction with disposable sheaths in order to arrive at an inexpensive yet accurate system.

In one of its aspects, the present invention takes advantage of the fact that long lengths of thermocouple wire from a single manufacturing run are remarkably uniform in thermo-electric coefficient, particularly over the relatively small range of temperatures encountered in the clinical thermometry field. Hospital rooms are usually maintained in the neighborhood of 70° F. while the body temperature range which must be accomodated by a thermometer is only about 95° F. to 105° F. Premium thermocouple wire is probably marginally accurate enough to be usable over the ten degree measurement range, but an entirely unacceptable error arises because of the 30° spread in temperature between the measured temperature and the cold junction temperature. The present invention automatically adjusts both the cold junction compensation and the gain of the measurement circuitry to account for variations in wire calibration.

It is theoretically possible, of course, to manufacture an electronic thermometer with a heated reference junction where the transition between the disposable probe wire and internal thermometer wire takes place at a stabilized elevated temperature, but such a thermometer would likely be expensive and impractical on account of energy requirements and other problems. As a practical matter, a clinical thermometer using thermocouple probes would of necessity make the transition from the thermocouple wire of the probe to internal wiring at room temperature, and therefore an effective reference temperature must be established by means of a "cold junction compensator". A cold junction compensator is a temperature sensitive electrical network which is kept in close thermal contact with the junctions between the thermocouple wire and the copper wire within the thermometer, and which provides a varying voltage to just counteract the voltage generated by the copper/thermocouple wire junctions as their temperature varies.

Historically, thermocouple reference junctions, or "cold junctions" were maintained at a temperature of 32° F. or 0° C. in a bath comprised of a mixture of ice and water. Consequently, most thermocouple tables were compiled for a 0° C. reference temperature, and even today the most recent standard for thermocouple characteristics, NBS Circular 125, is based on a 0° C. reference temperature. Hence it is conventional to use a 32° F. reference temperature. One aspect of the present invention is the use of an effective reference temperature within the measurement range of 90° F. to 110° F. The invented thermometer preferably uses a 98.6° F. reference temperature, but could use a reference temperature anywhere within its indication range of 90° F. to 110° F. without serious loss of accuracy.

The presently preferred embodiment of the invention herein described utilizes a bridge network to generate the voltage necessary to offset the voltage of the cold junctions, as is conventional in the cold junction compensator art. What is not conventional are a plurality of resistors which are selectively used to shunt the output of the bridge to vary the offset voltage to correspond with that required by the actual thermoelectric coefficient of the thermocouple pair used. Also not conventional are a plurality of resistors which selectively alter the feedback ratio of an amplifier in the measurement circuitry so as to change the scale factor of the thermometer as required by the wire calibration.

The particular resistors used to shunt the bridge output and vary the amplifier gain are selected by sensing markings or indicia on the box containing the probes. The encoding systems described herein are, of course, only two of many possible ways of storing information representative of the transfer functions of the probes. The markings, for example, can be spots sensed photoelectrically, conductive strips sensed by brushes, magnetic areas sensed magnetically, notches or holes sensed mechanically, or any of a myriad of well-known or not so well-known sensing schemes.

Since, as noted above, long lengths of wire with uniform calibration can be obtained, a large number of probes can be manufactured and boxed in similarly marked boxes on the basis of calibrations involving a single or a small number of samples of wire.

Since the invented thermometer is intended as a portable unit to be carried from hospital room to hospital room taking patient's temperatures, battery power conservation is an important consideration. While the use of liquid crystal displays and low power electronic components have reduced the problem in recent years, nevertheless, it is common for nurses (or others) to forget to turn instruments off after use and thus drain the batteries relatively rapidly. To counteract this problem, the invented thermometer includes means responsive to the resistance of a thermocouple probe to turn the power to the unit on when a probe is connected and to turn it off when the probe is disposed of.

BRIEF DESCRIPTION OF THE DRAWINGS

FIG. 3 is a top view of the container of FIG. 2.

FIG. 6 is a perspective view of an enclosure for the signal conditioning circuitry of the present invention.

FIG. 6A is a partial perspective view of an enclosure similar to that shown in FIG. 6 except that it is for use with the probe box shown in FIG. 2A.

FIG. 7 is a perspective view of a probe holder suitable for use with the probe of FIG. 1.

FIG. 8 is a schematic diagram of the present invention.

FIG. 8A is a partial schematic diagram showing the use of mechanical switch sensing as shown in FIG. 6A for use with a probe container such as shown in FIG. 2A.

DETAILED DESCRIPTION OF THE INVENTION

Figure 1:
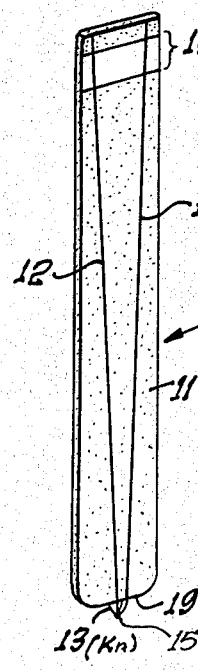
FIG. 1 is a perspective view of a thermocouple probe suitable for use with the present invention.
Figure 1A:
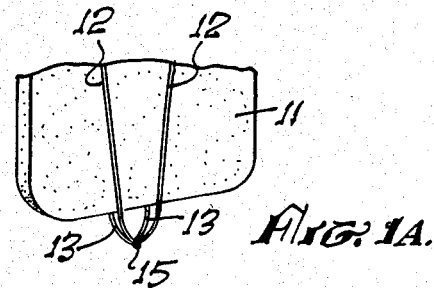
FIG. 1A is an enlarged view of the bottom portion of FIG. 1 showing the thermocouple junction in more detail.

FIG. 1 depicts a bare bead thermocouple probe 10 such as would be suitable for use with the present invention. The probe includes a slat like body 11 preferably fabricated of plastic or cardboard, onto which thermocouple wire is adhered. A thermocouple junction is made at one end of the body and a connection area provided at the other. In the embodiment shown in FIG. 1, a length of Chromel 12 is looped along one surface of body 11 leaving a portion of the wire overhanging the end. A similar loop of Constantan 13 is looped along the obverse side of the body. Chromel and Constantan (a type E thermocouple) have been chosen for purposes of example, but it should be understood that other thermocouple materials could be used in practising the present invention if desired. The two lengths of thermocouple wire are adhered to the body as by taping or spraying with adhesive. A window 14 in the tape or adhesive is left near the connection end of the body to allow for electrical contact with the wires. At the junction end, the overhanging portions of the wires 12 and 13 are welded at the point furthermost from the body, forming the measuring junction 15. While the size of the thermocouple wire used is not critical, it can be appreciated that the finer the wire, the faster will be the response, but that too fine a wire will result in insufficient structural rigidity. Wire diameters of from 0.002 to 0.005 inches have been found to be most suitable but wire sizes outside this range may also be used.

Figure 4:
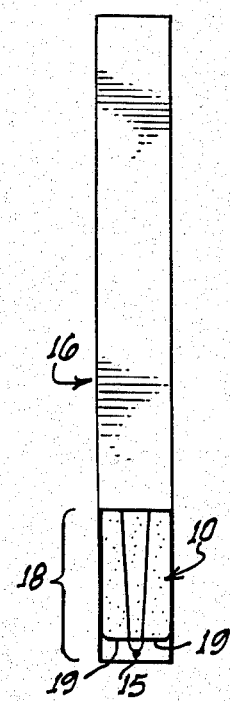
FIG. 4 is an end view of the container of FIG. 2.
Figure 2:
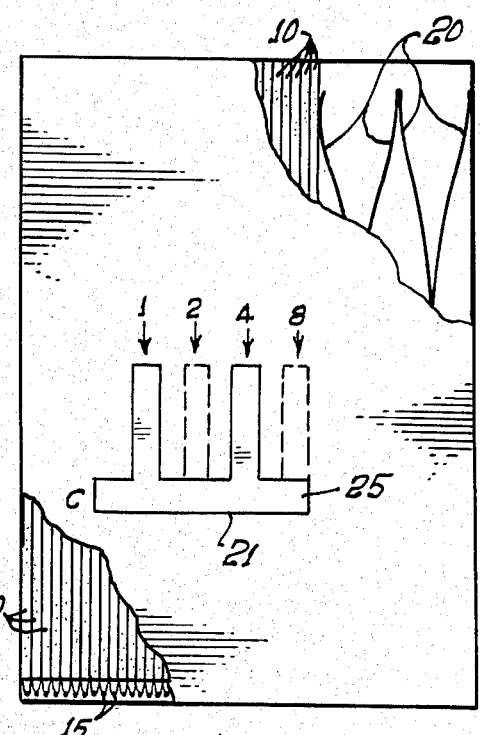
FIG. 2 is a side view of a container for holding a plurality of the probes of FIG. 1, partially cut away.

A plurality of probes 10, for example, 50 to 100, may conveniently be packaged in a cardboard or light plastic box such as box 16 shown in FIGS. 2, 3 and 4. At the top of the box 16 and at one end thereof is a slot 17 through which probes may be dispensed as needed. As will be discussed later, a probe is dispensed by engaging the bottom portion 19 of the probe body with a claw and pushing it upward. The probes 10 in the box are forced toward the dispensing end by a leaf spring 20.

A pattern 21 containing indicia relating to the emf-/temperature characteristic of the probe is printed in conductive ink on the side of the box 16. The indicia imprinted depends upon the actual thermoelectric coefficient of the wire used to make the probes 10 in that particular box. It is a calibration code which indicates how much the probes in the box diviate from some particular calibration, for example, a standard NBS calibration as defined in NBS Circular 125. One or more probes from a group of boxes containing probes made from uniform thermocouple wire are tested to establish the deviation for that particular group of probes, and indicia representing that deviation is printed in the form of pattern 21 on all boxes of that group. The vertical legs 1, 2, 4 and 8 of pattern 21 represent a hexadecimal number in binary form related to the deviation. The use of four legs allows sixteen calibrations to be accommodated. Fewer or more legs might be required depending on the expected spread in wire calibration and what portion of the total error budget can be devoted to wire calibration error.

An exemplary pattern is printed on the box illustrated in FIG. 2 with legs representing 1 and 4 imprinted and legs 2 and 8 omitted. The dotted lines indicating the positions of omitted legs 2 and 8 are shown for purposes of illustration only and would not necessarily appear on an actual box. Depending on the calibration of the probes contained in the box, the pattern 21 would be imprinted with none of the legs, or any number up to all four. In the embodiment of the invention described herein, no legs would represent probes having the highest thermoelectric coefficient, all four legs would represent probes having the lowest, and the two legs imprinted in the illustration of FIG. 2 (1 and 4) would represent probes having a slightly higher than average coefficient.

Figure 2A:
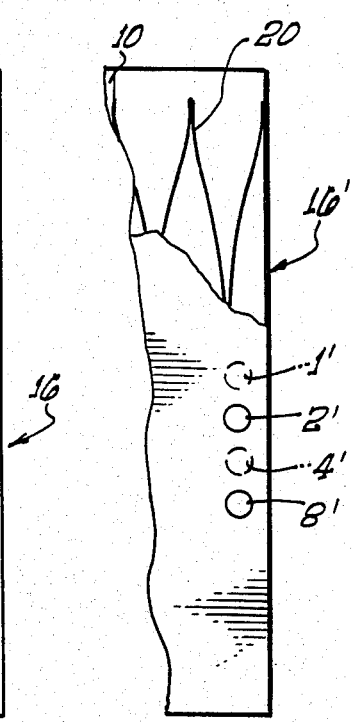
FIG. 2A is a partial side view of a container similar to that shown in FIG. 2 except that an alternate way of encoding the temperature/emf characteristic of the probe is shown.

In the partial view FIG. 2A, a different method of encoding the indicia representing the probe calibration is shown. Instead of pattern 21 with conductive legs representing the calibration, a pattern of four holes, 1', 2', 4' and 8' are the code. Holes 2' and 8' are shown punched but only the positions of holes 1' and 4' are indicated. As will be discussed later, this pattern represents the same calibration as shown in FIG. 2.

A thermometer enclosure designed to use the probes previously described is shown in FIG. 6. A compartment 23 is provided to house box 16. The door 24', when closed, holds the box in place and a claw, not shown, coupled to spring loaded knob 24 dispenses the probes through slot 17-1 as needed. Actuation of knob 24 pushes a probe up through slot 17-1 exposing enough of the top portion of the probe so that it can be grasped by probe holder 31 (See FIG. 2) and removed from the thermometer enclosure. Polarity is, of course, important in connecting thermocouples into measuring circuits. Means can be provided, if desired, to prevent backwards insertion of a probe 10 into holder 31.

Probe holder 31 includes a pivoted clamp 32 which clamps the probe against the body of probe holder 31. Button 33 is depressed to open the clamp for insertion or removal of a probe. The probe holder contains contacts 34 and 35 (which are shown in the schematic diagram of FIG. 8) for contacting the thermocouple wire at windows 14 on the probe 10. These contacts are preferably fabricated from thermocouple materials which match the wire of the probes, but if the probe holder is carefully designed so that the thermal gradients between the contacts and temperature sensitive resistor 36 (which is also contained within probe holder 31) are low, copper or another material might be used. If contacts 34 and 35 are made of thermocouple material, then the transition to copper is made at junctions 37 and 38. Thermocouple circuits are extremely low level circuits and care must be taken in design and fabrication to avoid temperature gradients and stray emfs. It is important that the temperature difference between resistor 36 and the points at which thermocouple material joins copper be very low, whether that be at contacts 34 and 35, or at junctions 37 and 38. Three conductor cable 39 connects the probe holder 31 to the signal conditioning circuitry.

Temperature sensitive resistor 36, together with temperature stable resistors 40, 41 and 42, form a bridge whose output voltage varies with temperature by the same amount as the output of a probe. The bridge 36, 40, 41 and 42 is energized by battery 43 acting through IGFET 44 and dropping resistor 45, while Zener diode 46 regulates the applied voltage. It is preferably an unequal arm bridge with resistors 41 and 42 being much larger than resistors 36 or 40.

Since greatest accuracy is desired in the region of normal body temperature (98.6° F.), it is desirable that the effective reference temperature of the thermocouple system be set at 98.6° F., or close thereto. Actually, any convenient reference temperature between 95° F. and 105° F. would be satisfactory, and, in fact, reasonable accuracy can be achieved using a reference temperature between 90° F. and 110° F.

Resistor 36 can conveniently be wound of copper or Balco, both of which have a temperature coefficient of resistance of about 0.25%/°F. at about 70° F. Since resistor 41 is much larger than resistor 36, the change in voltage across resistor 36 is very nearly equal in percentage to its change in resistance. Thus, since a type E thermocouple has an output of about 34.1 microvolts/°F. around 70° F., if the resistor 36 were wound of copper, the voltage across it at 70° F. should be set to about 13.64 millivolts, which, because of the temperature coefficient of copper, would result in a change in bridge output of 34.1 microvolts/°F. The exact voltage would depend on the actual coefficient of the resistor material used and the loading effect of resistor 41.

Resistor 40 and/or 42 are used to set the reference temperature. Assuming that the desired reference temperature is to be 98.6° F., the voltage at junction 37 to ground should be exactly zero when a probe 10 having the highest thermoelectric coefficient expected is connected to contacts 34 and 35 while its junction 15 is at exactly 98.6° F. All of the components within probe holder 31 should preferably be at about 70° F. when this setting is made.

Returning to FIGS. 2 and 6, pattern 21 is positioned on box 16 such that when in compartment 23, the horizontal bar 25 engages spring contact 26. This is the "common" connection to pattern 21. Similarly, spring contact 27 contacts the "1" leg of pattern 21 (if present) and so on, contacts 28, 29 and 30 engaging the "2", "4" and "8" legs respectively. Contact 26 is connected to ground while contacts 27, 28, 29 and 30 are connected through resistor 47, 48, 49 and 50, respectively, to the junction of resistors 41 and 36.

Resistors 47 through 50 load the output of bridge 36, 40, 41 and 42 so as to maintain the effective reference temperature at the selected value. The resistors 47 through 50 are selected to have differing effects on the output of bridge 36, 40, 41, 42 approximately in the proportions 1, 2, 4, and 8 as indicated by the leg numbers. The absolute values of resistors 47 through 50 is such that if all of legs 1, 2, 4 and 8 are present on a particular box 16 inserted in a thermometer, the bridge would be loaded such that a probe with the lowest expected thermoelectric coefficient connected to contacts 34 and 35 would generate zero volts at junction 37 if its measuring junction were at the selected reference temperature.

By way of example, it can be determined from NBS Circular 125 that the average emf output of a type E thermocouple between 70° F. and 98.6° F. is 974 microvolts. If we assume that a supplier of thermocouple wire for probes specifies that wire will be supplied conforming to NBS Circular 125 over this range within plus or minus 20 microvolts, we can expect wire having an output somewhere between 954 microvolts and 994 microvolts to be supplied. If resistors 36, 40, 41 and 42 have values such that the resistance measured from the junction of resistors 36 and 41 to ground is 100 ohms at 70° F., and if the voltage to ground with none of the resistors 47–50 connected is set to 994 microvolts, suitable values for resistors 47–50 would be 360K, 180K, 90K and 45K respectively.

If all of the legs of pattern 21 were present, the bridge output voltage would drop from 994 microvolts to 954 microvolts; if only leg 1 was present the voltage would be 991 microvolts, and with legs 4 and 1 as illustrated in FIG. 2, the voltage would drop to 980 microvolts. The above numbers were developed assuming a room temperature of 70° F. (more precisely, a temperature of 70° F. at resistor 36 and junctions 37 and 38) to show the function and operation of legs 1, 2, 4 and 8 and resistors 47–50. As room temperature varies, resistor 36 causes the output of the bridge to vary so as to maintain the proper relationship between the voltages and to maintain an effective 98.6° F. reference temperature.

In a similar fashion, the scale factor of the signal conditioning circuitry is altered to accomodate the actual probe calibration. Amplifier 51 in combination with IGFETS 52, 53, 54 and 55, and capacitor 56 comprise a chopper stabilized amplifier whose output is developed across capacitor 57. The voltage across capacitor 57 is zero is measuring junction 15 is at the effective reference temperature. The voltage is either positive or negative if the temperature of junction 15 is higher or lower than the effective reference temperature. The gain of amplifier 51 is set by the feedback network comprised of resistors 58 and 59. If the calibration of the probe 10 in use is lower than nominal, i.e., fewer microvolts/degree change in temperature, the gain of amplifier 51 can be increased over nominal to maintain the net scale factor of the system. This can be accomplished by shunting resistor 59 to reduce the feedback factor of the feedback network, resistor 59. Resistors 47' to 50' in conjunction with contacts 27' to 30' selectively shunt resistor 59 so that for lower output probes, the gain of amplifier 51 is appropriately increased.

By the above described means, the system scale factor as well as the effective reference temperature (i.e., the measuring junction temperature which results in zero voltage to the measuring circuit) can be maintained even though the thermoelectric coefficients associated with various batches of probes are different. It can be seen that by suitable selection of the legs of pattern 21, the output voltage of any expected thermocouple probe can be closely matched. If a pattern 21 were designed to have a larger number of legs, the thermocouple probes could be matched with greater precision.

FIG. 6A, is a partial view of the thermometer enclosure showing the elements which would cooperate with holes 1', 2', 4' and 8' if a probe box 16' such as shown in FIG. 2A were used. The rod like elements protruding from the back wall of cavity 23 are actuator pins for switches 27", 28", 29" and 30" which may be seen in FIG. 8A. If the box 16' illustrated in FIG. 2A were inserted in compartment 23, switches 27" and 29" would be actuated since there are no holes in box 16' corresponding to the positions of these actuator pins. Switches 28" and 30" would not be actuated, however, since their actuator pins would simply pass through holes 2' and 8'. As can be seen from FIG. 8A, actuation of switches 27" and 29" would cause resistors 47, 47', 49 and 49' to be connected to ground with the same result as in the case of the pattern 21 illustrated in FIG. 2 where contacts 27 and 29 also caused resistors 47, 47', 49 and 49' to be grounded.

Figure 5:
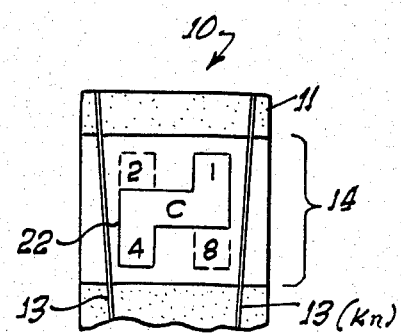
FIG. 5 is a side view of the top portion of an alternate construction of the probe of FIG. 1, showing the side opposite to that seen in FIG. 1.

In yet another alternative construction, instead of imprinting the calibration code on the box as illustrated in FIG. 2 or punching holes in the box as in FIG. 2A, the code could be imprinted on each individual probe as shown in FIG. 5. FIG. 5 shows the top portion of a probe with an H shaped conductive marking 22. The four legs of the H represent the numbers 1, 2, 4 and 8 while the horizontal bar is the common. As before, the legs representing 2 and 8 are shown imprinted while the legs representing 1 and 4 are shown dotted to show their position when and if needed. If the calibration code is applied to the probes themselves rather than to the box, spring contacts 26–30 and 26'–30' would, of course, have to be housed in probe holder 31 rather than in the thermometer case. No detailed showing of this construction is presented, however, since it is believed that such mechanical details of construction are well within the skill of an ordinary worker in the art.

The imprinting of the calibration code on the probe itself instead of on an associated item is not meant to suggest that each probe must be tested for calibration. Depending upon the uniformity of the particular wire, possibly only one in a thousand, or one in ten thousand probes or more need be tested, and all probes (or boxes) using the same sub-batch of thermocouple wire may be marked with the same code.

Analog to digital converter 60 converts the voltage at capacitor 57 to digital information which is coupled to display 61 where the temperature being sensed by junction 15 is displayed. The output of A/D 60 can, of course, be fed to a data acquisition system rather than to display 61, if required. Clock pulses for driving IGFETS 52, 53, 54 and 55 are provided by oscillator 67 and network 68.

In order for display 61 to read out directly in degrees fahrenheit or centigrade, certain scaling and offset functions must be included in A/D 60 and/or display 61. Performing these functions is well within the state of the art and forms no part of the present invention, thus no detailed description of same is presented.

Power to drive the measuring circuit is derived from battery 62. In order to conserve energy, and to prevent running the batteries down because of a failure to turn the unit off after use, an automatic power switch is included in the thermometer. This automatic switch is resistance responsive and turns power on to the system whenever a low resistance is connected across contacts 34 and 35. Thus, whenever a probe is inserted in probe holder 31, the power is turned on and conversely, whenever a probe is removed, the power is turned off. NOR gate 63 is a CMOS gate which draws essentially no power in its quiescent state. One input is grounded and the other connected to contact 34 directly and to the positive terminal of battery 62 through resistor 64. Resistor 64 is preferably a very high value, for example 22 megohns, so that variations in battery 62 voltage will not cause errors in the measurement cycle.

When no probe is in probe holder 31, the output of NOR gate 63 is low and transistor 65, whose base is fed by the output of NOR gate 63 is OFF. The base of transistor 66 is then floating and it too conducts no current. When a probe is inserted, NOR gate 63 goes high, and transistors 65 and 66 both turn ON. IGFET 44 turns the cold junction compensator on when power is on. Resistors 67 and 68 are current limiting resistors.

What has been disclosed is a system for reducing errors in instruments used to make physical measurements. Both scale factor and zero or reference adjustments have been described. In some applications, only one or the other will be required while in others both scale factor and zero adjustments will be needed. Which adjustments are appropriate in any individual application will depend upon the sensor calibration spread expected, the effect on zero and scale, and the portion of the total error budget which can be alloted to the expected error. The specific embodiment disclosed herein is one wherein both zero and scale factor variations can be compensated for using a single set of indicia. It will be obvious to those skilled in the art, however, that there may be applications where separate sets of indicia are required to compensate the system for both zero and scale factor. The teachings herein are applicable to such situations. This and other variations and applications of the principles disclosed herein are expected to occur to those skilled in the art and are intended to be within the scope of the following claims.

I claim:

1. An electronic thermometer for measuring human body temperatures which comprises:
    (a) a replaceable thermocouple probe for sensing a temperature to be measured; and
    (b) signal conditioning means including:
        (i) a cold junction compensator for providing an effective reference temperature between 90° F. and 110° F.; and
        (ii) means responsive to said cold junction compensator and voltage output of said thermocouple probe for providing an output representative of the temperature being measured.

2. An electronic thermometer as recited in claim 1 wherein said effective reference temperature is 98.6° F.

3. An electronic thermometer as recited in claims 1 or 2 and further including indicia affixed to said thermocouple probe, said indicia representing the emf/temperature characteristic of said thermocouple probe, and wherein said means responsive to said cold junction compensator and the output of said thermocouple probe is additionally responsive to said indicia.

4. A system for measurement of a physical variable which comprises:
    (a) replaceable sensing means for sensing a physical variable to be measured, said sensing means being selected from a group of sensing means, each having substantially the same transfer function, said transfer function being within a range of transfer functions dependent on manufacturing variances;
    (b) replaceable calibration means having a characteristic depending on said transfer function; and
    (c) signal conditioning means responsive to said sensing means and to said characteristic for producing an output representative of the magnitude of said physical variable being measured substantially independent of said manufacturing variances.

5. The measurement system as recited in claim 4 wherein said calibration means includes a code encoded in the form of markings on a container for storing one or more of said replaceable sensing means.

6. The measurement system as recited in claim 5 wherein said markings are electrically conductive, and where said signal conditioning means includes electrical contacts for sensing the presence of said conductive markings.

7. The measurement system as recited in claim 4 where said calibration means includes a code encoded in the form of cut out portions of a container for storing one or more of said replaceable sensing means.

8. The measurement system as recited in claims 4, 5, 6 or 7 wherein said calibration means alters the scale factor of said signal conditioning means.

9. The measurement system as recited in claims 18, 19, 20, or 21 wherein said calibration means offsets the output of said signal conditioning means by a fixed amount.

10. A thermocouple probe for use in a temperature measuring system which comprises:
    (a) an elongate body;
    (b) thermocouple wire attached to said body with a thermocouple junction at one end of said body, said thermocouple wire being adapted for connection to an external circuit at the other end of said body; and
    (c) a calibration code representative of the transfer function of said thermocouple junction encoded in machine readable form, said encoding being adapted to adjust said external circuit to be compatible with the emf/temperature relationship of said thermocouple probe.

11. A thermocouple probe as recited in claim 10 where said calibration code is in the form of markings on said body.

12. A thermocouple probe as recited in claim 11 wherein said markings are conductive areas on said body.

13. A thermocouple probe as recited in claim 10 where said calibration code is in the form of cut out portions of said body.

14. An electronic thermometer which comprises:
    (a) a replaceable thermocouple probe for sensing a temperature to be measured;
    (b) replaceable calibration altering means having a characteristic depending on the emf/temperature characteristic of said probe; and
    (c) signal conditioning means coupled to said probe and said calibration altering means, said calibration altering means altering the output of said signal conditioning means by a constant amount depending on said emf/temperature characteristic of said probe whereby the output of said signal conditioning means is a representation of said temperature being measured.

15. An electronic thermometer as recited in claim 14 wherein the output of said signal conditioning means is a visual numeric representation of said temperature being measured.

16. An electronic thermometer as recited in claims 14 or 15 wherein said calibration altering means includes markings on a container which contains one or more of said probes.

17. An electronic thermometer as recited in claim 16 wherein said markings are conductive areas on said container, and further including electrical contacts for sensing the presence or absence of said markings, said electrical contacts being coupled to said signal conditioning means.

18. An electronic thermometer as recited in claims 14 or 15 wherein said calibration altering means includes cut out portions of a container containing one or more of said probes.

19. An electronic thermometer as recited in claim 18 and further including switch means for cooperating with said cut out portions to sense the presence or absence of said cut out portions, said switch means being coupled to said signal conditioning means.

20. An electronic Thermometer as recited in claim 14 and further including means for adjusting the scale factor of said signal conditioning means responsive to said calibration altering means.

21. In an electronic thermometer of the type comprising a replaceable thermocouple probe and signal conditioning means, the improvement which comprises means responsive to impedance connected across the input of said signal conditioning means for energizing said signal conditioning means when a thermocouple probe is connected to said input, and for deenergizing said signal conditioning means when said thermocouple probe is disconnected.

22. An electronic thermometer which comprises:
(a) a thermocouple temperature sensing system including a replaceable measuring junction having a known transfer function, and one or more reference junctions, said measuring junction being selected from a group of measuring junctions each having substantially the same transfer function, said transfer function being within a range of transfer functions dependent on manufacturing variances;
(b) signal conditioning means responsive to voltage produced by said measuring junction for providing an output depending on the temperature of said measuring junction; and
(c) replaceable means which alters the output of said signal conditioning means by an amount depending on said known transfer function whereby the effect of said manufacturing variances on said output is reduced.

23. An electronic thermometer according to claim 22 where the amount of said alteration of the output of said signal conditioning means in accordance with said known transfer function is substantially independent of the temperature of said measuring junction.

24. An electronic thermometer according to claim 22 where said alteration of the output of said signal conditioning means in accordance with said known transfer function includes one amount which is independent of the temperature of said measuring junction and a second amount which depends on the difference between the temperature of said measuring junction and a predetermined temperature.

25. An electronic thermometer according to claims 22, 23, or 24 where said means which alters the output of said signal conditioning means in accordance with said known transfer function includes a representation of said known transfer function affixed to a container for storing said measuring junction.

26. An electronic thermometer according to claim 25 where said representation of said known transfer function is affixed to said container in the form of indicia applied to said container.

27. An electronic thermometer according to claim 25 where said representation of said known transfer function is affixed to said container in the form of cut out portions of said container.

28. An electronic thermometer as recited in claims 22, 23, or 24 and further including a variable DC voltage source for setting an effective reference temperature.

29. An electronic thermometer as recited in claim 28 wherein said effective reference temperature is between 90° F. and 110° F.

30. An electronic thermometer as recited in claim 28 wherein said effective reference temperature is 98.6° F.

31. An electronic thermometer as recited in claim 22, 23, or 24 wherein said means for altering the output of said signal conditioning means comprises one or more resistors coupled to said signal conditioning means.

32. An electronic thermometer as recited in claim 22, 23, or 24 wherein said output is a visual numeric display.

33. A method of measuring the magnitude of a physical variable using a sensor having an electrical characteristic responsive to said physical variable and signal conditioning means responsive to said characteristic which comprises the steps of:
(a) packaging together a plurality of sensors for sensing said physical variable, each of said sensors being selected to have a transfer function substantially identical to the transfer function of each other of said plurality of sensors;
(b) providing calibration adjusting means with said plurality of sensors, said calibration adjusting means having a characteristic for adjusting the calibration of said signal conditioning means to have a predetermined output when coupled to one of said plurality of sensors upon exposure to a predetermined magnitude of said physical variable;
(c) coupling one of said sensors to said signal conditioning means;
(d) coupling said calibration adjusting means to said signal conditioning means; and
(e) exposing said one of said sensors to a physical variable to be measured.

34. The method as recited in claim 33 wherein at least a portion of said calibration adjusting means is affixed to a container in which said sensors are packaged.

35. The method as recited in claims 33 or 34 wherein said sensors are thermocouples and said physical variable is temperature.

36. In a measuring system for measuring the magnitude of a physical variable, said system having replaceable sensors and signal conditioning means, the improvement which comprises:
(a) a group of replaceable sensors selected to have substantially identical transfer functions; and
(b) replaceable calibration adjusting means having a characteristic depending on said transfer function for use in conjunction with any one of said replaceable sensors to adjust the calibration of said signal conditioning means responsive to said characteristic.

37. The measuring system improvement as recited in claim 36 where said physical variable is temperature.

38. The measuring system improvement as recited in claim 36 where said sensors are thermocouples.

39. The measuring system improvement as recited in claims 36, 37, or 38 where said sensors are packaged in a container and at least a portion of said calibration adjusting means is affixed to said container.

* * * * *